United States Patent
Suzuki et al.

(10) Patent No.: US 11,586,038 B2
(45) Date of Patent: Feb. 21, 2023

(54) IMAGE PROJECTION DEVICE

(71) Applicant: QD LASER, INC., Kawasaki (JP)

(72) Inventors: Makoto Suzuki, Kawasaki (JP); Kenji Yasui, Kawasaki (JP); Mitsuru Sugawara, Kawasaki (JP)

(73) Assignee: QD LASER, INC., Kawasaki (JP)

( * ) Notice: Subject to any disclaimer, the term of this patent is extended or adjusted under 35 U.S.C. 154(b) by 175 days.

(21) Appl. No.: 16/476,296

(22) PCT Filed: Oct. 5, 2017

(86) PCT No.: PCT/JP2017/036314
§ 371 (c)(1),
(2) Date: Jul. 7, 2019

(87) PCT Pub. No.: WO2018/135046
PCT Pub. Date: Jul. 26, 2018

(65) Prior Publication Data
US 2019/0353897 A1    Nov. 21, 2019

(30) Foreign Application Priority Data
Jan. 20, 2017 (JP) .............................. JP2017-008460

(51) Int. Cl.
*G02B 27/00* (2006.01)
*G02B 27/01* (2006.01)
(Continued)

(52) U.S. Cl.
CPC ..... *G02B 27/0081* (2013.01); *G02B 27/0172* (2013.01); *G02B 27/30* (2013.01);
(Continued)

(58) Field of Classification Search
CPC .. G02B 26/101; G02B 26/105; G02B 26/121; G02B 2027/0178; G02B 26/10;
(Continued)

(56) References Cited

U.S. PATENT DOCUMENTS 6,252,565 B1    6/2001  Hall
8,403,490 B2 *  3/2013  Sugiyama ............... G02B 26/06
                                                  359/630
(Continued)

FOREIGN PATENT DOCUMENTS

CN    101589329 A    11/2009
CN    101726854 A     6/2010
(Continued)

OTHER PUBLICATIONS

Written Opinion of the International Searching Authority for International Application No. PCT/JP2017/036314 dated Jan. 9, 2018 (10 pages translation).

(Continued)

*Primary Examiner* — Thomas K Pham
*Assistant Examiner* — Henry A Duong
(74) *Attorney, Agent, or Firm* — Kratz, Quintos & Hanson, LLP

(57) ABSTRACT

An image projection device includes: a light source emitting a light beam; an image input unit inputting image data; a control unit generating an image light beam based on the input image data, and controlling emission of the image light beam from the light source; a scan unit scanning the image light beam emitted from the light source; and a projection optical member illuminating a retina of an eyeball of a user with the image light beam scanned by the scan unit, and projecting an image onto the retina, wherein a diameter of the image light beam at a time when the image light beam enters a cornea of the eyeball is not smaller than 310 μm and not larger than 800 μm, and a user having an original visual acuity in a range of 0.04 to 1.2 has an acquired visual acuity of 0.4 or higher.

6 Claims, 9 Drawing Sheets

(51) Int. Cl.
*G02B 27/30* (2006.01)
*G09G 3/02* (2006.01)
*G02B 26/10* (2006.01)

(52) U.S. Cl.
CPC ............. *G09G 3/02* (2013.01); *G02B 26/105* (2013.01); *G02B 2027/0138* (2013.01); *G02B 2027/0178* (2013.01)

(58) Field of Classification Search
CPC  G02B 27/02; G02B 27/0081; G02B 27/0172; G02B 27/30; G02B 2027/0138; H04N 5/64; G09G 3/02
USPC ....................................................... 359/223.1
See application file for complete search history.

(56) References Cited

U.S. PATENT DOCUMENTS

| | | |
|---|---|---|
| 2008/0151185 A1 | 6/2008 | Saito |
| 2010/0060551 A1 | 3/2010 | Sugiyama |
| 2010/0091027 A1 | 4/2010 | Oyama |
| 2010/0097580 A1 | 4/2010 | Yamamoto et al. |
| 2014/0049831 A1 | 2/2014 | Takeda |
| 2014/0126033 A1 | 5/2014 | Hirata |
| 2014/0139404 A1 | 5/2014 | Takeda |
| 2014/0306866 A1 | 10/2014 | Miller |
| 2015/0062345 A1 | 3/2015 | Kusanagi |
| 2015/0235435 A1 | 8/2015 | Miller |
| 2015/0277115 A1 | 10/2015 | Inamoto |
| 2018/0067326 A1 | 3/2018 | Yonekubo |

FOREIGN PATENT DOCUMENTS

| | | | |
|---|---|---|---|
| CN | 103597399 A | 2/2014 | |
| CN | 103837985 A | 6/2014 | |
| JP | 2006-251509 A | 9/2006 | |
| JP | 2008-145701 A | 6/2008 | |
| JP | 2009-122550 A | 6/2009 | |
| JP | 2010-134052 A | 6/2010 | |
| JP | 2010-139575 A | 6/2010 | |
| JP | 2014-038239 A | 2/2014 | |
| JP | 2016-522463 A | 7/2016 | |
| WO | 2009/041055 A1 | 4/2009 | |
| WO | 2016/143245 A1 | 9/2016 | |
| WO | WO-2016143245 A1 * | 9/2016 | ............... G02B 5/10 |

OTHER PUBLICATIONS

Extended European Search Report for corresponding European Patent Application No. 17892869.3 dated Dec. 4, 2019 (9 sheets).
Y. Murai, et al.; "Low Vision Aid through Laser Retina Imaging: Toward Building Eyesightaid"; IEICE Technical Report; vol. 114; No. 512; Mar. 6, 2015; pp. 165-170 (2 cover pages, 6 pages, 4 pages translation, 12 pages total)/Cited in the International Search Report dated Jan. 9, 2018 for Int'l App. No. PCT/JP2017/036314.
Office Action of Japanese Patent Application No. 2017-008460: Notification of Reasons for Refusal dated Jun. 27, 2017 (5 pages, 4 pages translation, 9 pages total).
Office Action of Japanese Patent Application No. 2017-008460: Notice of Allowance dated Sep. 12, 2017 3 pages, 2 pages translation, 5 pages total).
International Search Report of the International Searching Authority for International Application No. PCT/JP2017/036314 dated Jan. 9, 2018 (2 pages, 2 pages translation, 4 pages total).
Written Opinion of the International Searching Authority for International Application No. PCT/JP2017/036314 dated Jan. 9, 2018 (6 pages).
Office Action of corresponding Chinese Patent Application No. 201780083486.1: First Notification of Reasons for Refusal dated Dec. 2020 (9 sheets, 5 sheets translation, 14 sheets total).
Office Action in counterpart Chinese Patent Application No. 201780083486.1 dated Jul. 27, 2021: Second Notification of Reasons for Refusal (7 sheets, 6 sheets translation, 13 sheets total).
Office Action of corresponding Chinese Patent Application No. 201780083486.1 dated Mar. 28, 2022 (4 sheets, 6 sheets translation, 10 sheets total).

* cited by examiner

IMAGE PROJECTION DEVICE

TECHNICAL FIELD

The present invention relates to an image projection device.

BACKGROUND ART

There have been known image projection devices such as head-mounted displays (HMDs) that directly project an image on the retina of the user by using a light beam emitted from a light source. In such image projection devices, a method referred to as Maxwellian view is used. In Maxwellian view, a light beam forming an image is converged near the pupil, and the image is then projected onto the retina. Because of this, HMDs that use Maxwellian view are expected to achieve focus-free properties.

In a see-through HMD with which an actual image of the outside world and a virtual image formed with a projected image can be viewed as superimposed images, it is known that the position of a lens is moved to change the focal length of the projected image so that the projected image can be clearly seen even in a case where actual images at different distances are viewed (Patent Document 1, for example).

PRIOR ART DOCUMENTS

Patent Document

Patent Document 1: Japanese Patent Application Publication No. 2010-139575

SUMMARY OF THE INVENTION

Problem to be Solved by the Invention

With an HMD using Maxwellian view there are cases where it is difficult to acquire focus-free properties, or the resolution that is felt by the user as to a projected image is low. Therefore, it is sometimes difficult for the user to view a high-quality image.

The present invention has been made in view of the above problem, and aims to provide users with high-quality images.

Means for Solving the Problem

The present invention is an image projection device including: a light source that emits a light beam; an image input unit that inputs image data; a control unit that generates an image light beam based on the input image data, and controls emission of the image light beam from the light source: a scan unit that scans the image light beam emitted from the light source; and a projection optical member that illuminates a retina of an eyeball of a user with the image light beam scanned by the scan unit, and projects an image onto the retina, wherein a diameter of the image light beam at a time when the image light beam enters a cornea of the eyeball is not smaller than 310 μm and not larger than 800 μm.

In the above configuration, the image projection device may further include a diameter adjustment unit that is disposed in a light path for the image light beam, has an opening for blocking part of the image light beam and allowing the other part of the image light beam, and adjusts the diameter of the image light beam at the time when the image light beam enters the cornea.

In the above configuration, the image projection device may further include a collimator that is disposed in a light path for the image light beam between the light source and the scan unit, and collimates the image light beam to form substantially parallel light, and the diameter adjustment unit may be disposed in a light path for the image light beam between the collimator and the scan unit.

In the above configuration, the image light beam at the time of entering the cornea may be substantially parallel light.

In the above configuration, the image data input to the image input unit may be image data along a line of sight of the user, the image data having been captured by a camera.

In the above configuration, a user having an original visual acuity in a range of 0.04 to 1.2 may have an acquired visual acuity of 0.4 or higher, the acquired visual acuity being a visual acuity for the image based on the image data and projected onto the retina.

In the above configuration, the acquired visual acuity is substantially constant for the user having the original visual acuity in the range.

The present invention is an image projection device including: a light source that emits a light beam; an image input unit that inputs image data; a control unit that generates an image light beam based on the input image data, and controls emission of the image light beam from the light source; a scan unit that scans the image light beam emitted from the light source; a projection optical member that illuminates a retina of an eyeball of a user with the image light beam scanned by the scan unit, and projects an image onto the retina; and an adjustment unit that adjusts a numerical aperture of the image light beam at a time when the image light beam enters a cornea of the eyeball.

In the above configuration, the image projection device may further include a collimator that is disposed in a light path for the image light beam between the light source and the scan unit, and collimates the image light beam to form substantially parallel light, and the adjustment unit may adjust the numerical aperture of the image light beam at the time when the image light beam enters the cornea, by moving a position of the collimator in a direction parallel to a traveling direction of the image light beam at a time when the image light beam passes through the collimator.

In the above configuration, the adjustment unit adjusts the numerical aperture of the image light beam at the time when the image light beam enters the cornea, by moving a position of the light source in a direction parallel to a traveling direction of the image light beam.

In the above configuration, the image projection device may further include a collimator that is disposed in a light path for the image light beam between the light source and the scan unit, and collimate the image light beam to form substantially parallel light, and the control unit may control and cause the adjustment unit to change a distance between the light source and the collimator, in accordance with an instruction from the user.

In the above configuration, the image light beam at the time of entering the cornea may be diverging light.

In the above configuration, the image data input to the image input unit may be image data along a line of sight of the user, the image data having been captured by a camera.

In the above configuration, a diameter of the image light beam at the time of entering the cornea of the eyeball may be not smaller than 800 μm and not larger than 3000 μm.

In the above configuration, the user having an original visual acuity that may be not lower than 0.04 but is lower than 1.2 has an acquired visual acuity higher than the original visual acuity, the acquired visual acuity being a visual acuity for the image based on the image data and projected onto the retina.

Effects of the Invention

The present invention can provide users with high-quality images.

EMBODIMENTS FOR CARRYING OUT THE INVENTION

The following is a description of embodiments of the present invention with reference to the drawings.

First Embodiment

Figure 1:
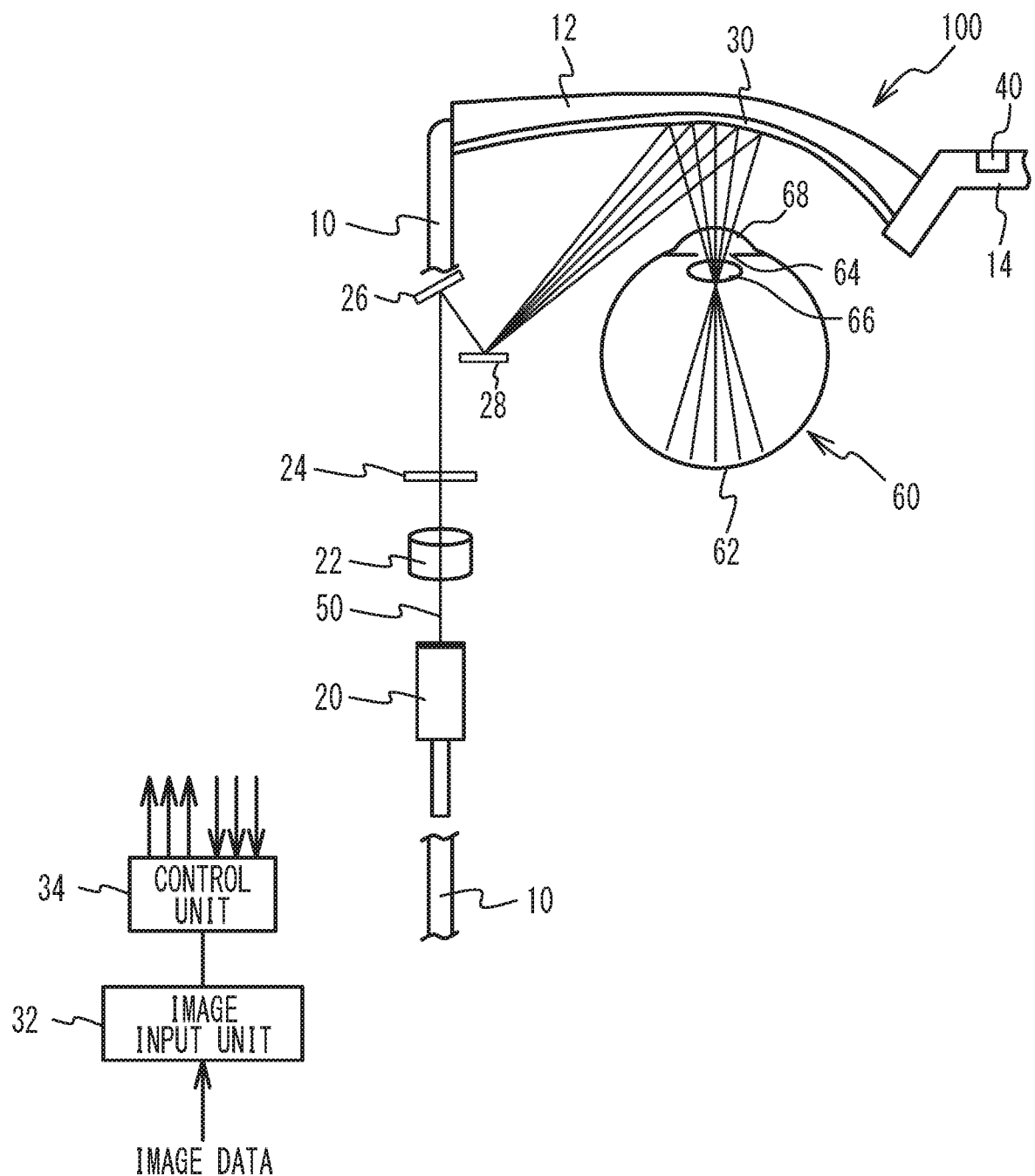
FIG. 1 is a top view of an image projection device according to a first embodiment.
Figure 2:
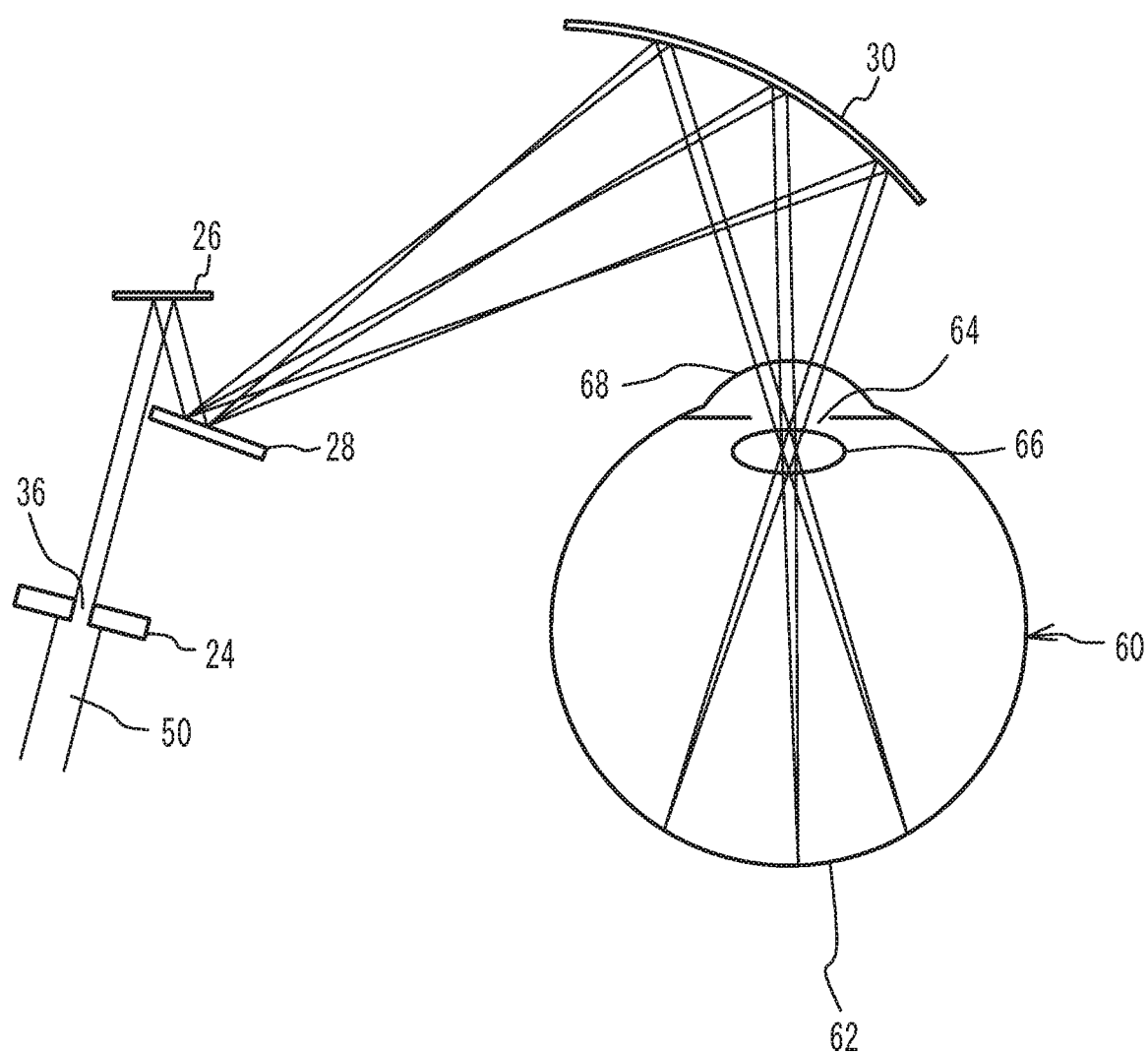
FIG. 2 is an enlarged top view of part of the image projection device according to the first embodiment.

FIG. 1 is a top view of an image projection device according to a first embodiment. FIG. 2 is an enlarged top view of part of the image projection device according to the first embodiment. As illustrated in FIGS. 1 and 2, an image projection device 100 of the first embodiment includes a light source 20, a collimator lens 22, a diameter adjustment unit 24, a mirror 26, a scan mirror 28, a projection mirror 30, an image input unit 32, and a control unit 34.

The image projection device 100 of the first embodiment is of an eyeglass type. An eyeglass includes a temple 10 and a lens 12. The temple 10 of the eyeglass is equipped with the light source 20, the collimator lens 22, the diameter adjustment unit 24, the mirror 26, and the scan mirror 28. The lens 12 is equipped with the projection mirror 30. The image input unit 32 and the control unit 34 may not be mounted on the eyeglasses, but may be mounted on an external device (such as a mobile terminal) or on the temple 10 of the eyeglass, for example.

Image data is input to the image input unit 32 from a camera 40 and/or a recorder or the like mounted on a bridge 14 of the eyeglass. In accordance with the input image data, the control unit 34 controls emission of laser light 50 from the light source 20. Under the control of the control unit 34, the light source 20 emits the laser light 50 of a single waveform or a plurality of waveforms, for example. The light source 20 may be a light source formed by integrating laser diode chips of red, green, and blue (RGB) and a tricolor combining device, for example. In this manner, the image data is converted into the laser light 50, which is an image light beam, by the light source 20.

The control unit 34 is a processor such as a central processing unit (CPU), for example. Where the camera 40 is directed along the line of sight of an eyeball 60 and is disposed at an appropriate position in the image projection device 100, line-of-sight image data captured by the camera 40 is input to the image input unit 32, and a line-of-sight image is projected onto a retina 62. Alternatively, an image input from a recorder or the like may be projected, or a camera image and an image from a recorder or the like may be superimposed on each other by the control unit 34 so that a so-called augmented reality (AR) image can be projected.

The collimator lens 22 collimates the laser light 50 emitted from the light source 20, to form substantially parallel laser light 50. Here, substantially parallel light is not necessarily perfectly parallel light, but may be slightly gathered light, for example.

The diameter adjustment unit 24 is disposed in the light path for the laser light 50 between the collimator lens 22 and the scan mirror 28. The laser light 50 collimated to be substantially parallel light by the collimator lens 22 enters the diameter adjustment unit 24. The diameter adjustment unit 24 has an opening 36 that blocks part of the laser light 50 and allows the rest of the laser light 50 to pass. The opening 36 has a substantially circular shape, for example. A substantially circular shape is not necessarily a perfectly circular shape, but may be a circular shape having a slightly deformed portion in its outer periphery or may be an elliptical shape. The center of the opening 36 almost coincides with the optical axis of the laser light 50. The diameter of the opening 36 is designed such that the laser light 50 falls within the range of 350 μm to 700 μm when the laser light 50 enters a cornea 68 of the eyeball 60 of the user. The opening 36 of the diameter adjustment unit 24 may be fixed at a certain size, or may be variable in size. For example, the size of the opening 36 of the diameter adjustment unit 24 may be changed by the control unit 34.

The mirror 26 reflects the laser light 50 that has passed through the diameter adjustment unit 24, toward the scan mirror 28. The scan mirror 28 two-dimensionally scans the laser light 50, to transform the laser light 50 into projection light for projecting an image onto the retina 62 of the eyeball 60 of the user. The scan mirror 28 is a micro electromechanical system (MEMS) mirror, for example, and two-dimensionally scans the laser light 50 in a horizontal direction and a vertical direction. The laser light 50 scanned by the scan mirror 28 enters the projection mirror 30 disposed on the surface of the lens 12 of the eyeglass on the side of the eyeball 60 of the user.

The projection mirror 30 illuminates the retina 62 of the eyeball 60 of the user with the laser light 50 scanned by the scan mirror 28, to project an image onto the retina 62. The user recognizes the image, by virtue of the persistence effect of the laser light 50 projected onto the retina 62. The projection mirror 30 is designed such that the convergence position of the laser light 50 scanned by the scan mirror 28 is near a pupil 64 in a region between the pupil 64 and the cornea 68, inside a crystalline lens 66, or near the pupil 64 in a region between the pupil 64 and the retina 62. FIG. 1 illustrates an example where the laser light 50 converges near the pupil 64 in the region between the pupil 64 and the retina 62. The projection mirror 30 is not necessarily in contact with the lens 12 of the eyeglass, but may be located at such a position that the laser light 50 can be projected onto the retina 62 through the pupil 64. Depending on the purpose of use, only the projection mirror 30 is provided, and the lens 12 is not necessarily provided.

The laser light 50 scanned by the scan mirror 28 may be gathered before the projection mirror 30, and the laser light 50 as diverging light may enter the projection mirror 30. In this case, the laser light 50 is transformed into substantially parallel light and enters the cornea 68, by virtue of the light-gathering power of the projection mirror 30. The laser light 50 is gathered near the retina 62 by the crystalline lens 66.

The laser light 50 scanned by the scan mirror 28 may be gathered before the projection mirror 30, and the laser light 50 as diverging light may enter the projection mirror 30. In this case, the laser light 50 is transformed into substantially parallel light and enters the cornea 68, by virtue of the light-gathering power of the projection mirror 30. The laser light 50 is gathered near the retina 62 by a crystalline lens 66.

The laser light 50 scanned by the scan mirror 28 converges near the pupil 64, and accordingly, passes through a portion close to the center of the crystalline lens 66. Because of this, the laser light 50 is hardly affected by the lens function (or the power of vision) of the crystalline lens 66, and acquisition of focus-free properties is expected. However, the diameter of the laser light 50 passing through the crystalline lens 66 has a finite value, and therefore, is somewhat affected by the lens function of the crystalline lens 66. For this reason, it is considered that focus-free properties may be difficult to acquire, depending on the diameter of the laser light 50.

An experiment conducted with respect to focus-free properties is now described. The experiment was conducted on a plurality of users having different visual acuities of 0.04, 0.5, 0.9, and 1.2, and was carried out by measuring how good each user was able to visually recognize an image projected onto the retina 62 while the diameter of the laser light 50 entering the cornea 68 was varied. The image projected onto the retina 62 is an image that has a horizontal viewing angle of 20 degrees, a screen aspect ratio of 16:9, and a valid vertical resolution of 720. For example, if the length of the eyeball is 24 mm, the size of the image projected onto the retina 62 is 5700 µm in the horizontal direction and 3200 µm in the vertical direction.

Figure 3:
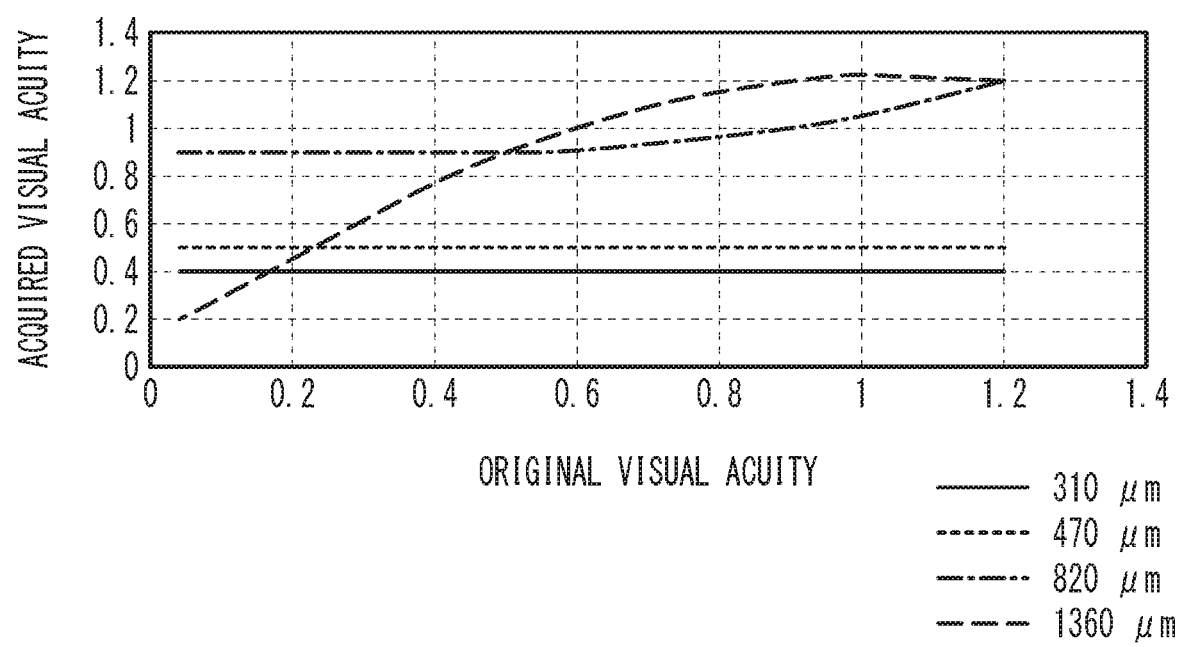
FIG. 3 is a chart showing the results of an experiment related to focus-free properties.

FIG. 3 is a chart showing the results of the experiment related to focus-free properties. In FIG. 3, the abscissa axis indicates original visual acuity, and the ordinate axis indicates acquired visual acuity. An original visual acuity is a visual acuity measured by a conventional visual acuity test. An acquired visual acuity is a visual acuity for an image projected onto the retina 62 of the user by the image projection device 100. In FIG. 3, a solid line represents the result in the case where the diameter of the laser light 50 entering the cornea 68 was 310 µm, a dotted line represents the result in the case where the diameter was 470 µm, a dot-and-dash line represents the result in the case where the diameter was 820 µm, and a dashed line represents the result in the case where the diameter was 1360 µm. It should be noted that the numerical aperture (NA) of the laser light 50 entering the cornea 68 was −0.001 to 0, and the laser light 50 was substantially parallel light entering the cornea 68.

As shown in FIG. 3, in a case where the diameter of the laser light 50 entering the cornea 68 is 310 µm, the acquired visual acuity is almost constant at about 0.4 even with different original visual acuities. In a case where the diameter is 470 µm, the acquired visual acuity is almost constant at about 0.5 even with different original visual acuities. On the other hand, in a case where the diameter of the laser light 50 entering the cornea 68 is as large as 820 µm or 1360 µm, the acquired visual acuity varies with the original visual acuity. As is apparent from these facts, in cases where the diameter of the laser light 50 entering the cornea 68 is not smaller than 310 µm and not larger than 470 µm, focus-free properties are acquired. It should be noted that, in a case where the diameter of the laser light 50 entering the cornea 68 is 820 µm, focus-free properties are not acquired technically, but the acquired visual acuity hardly vary when the original visual acuity is low.

Figure 4:
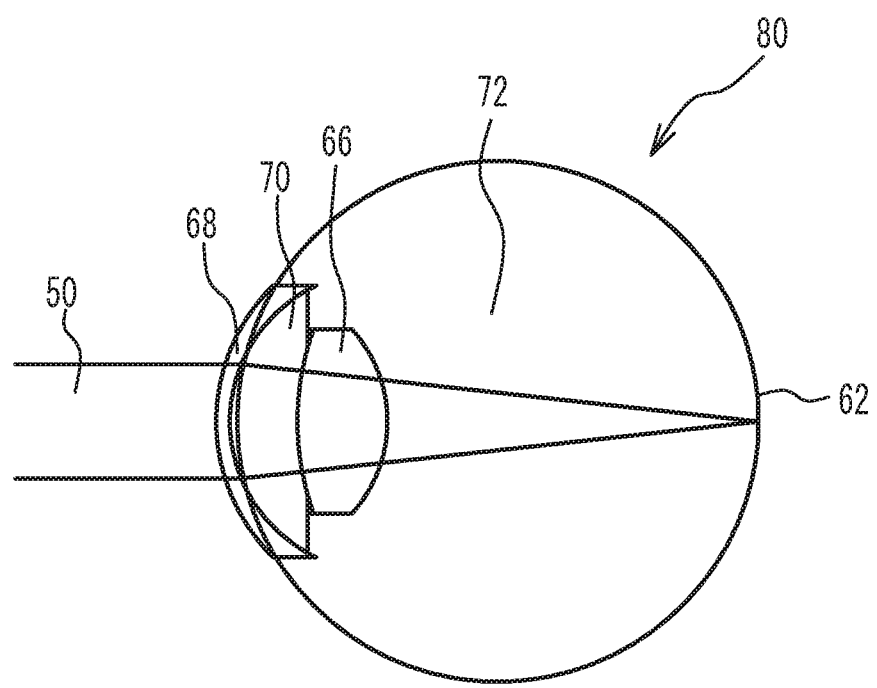
FIG. 4 is a view of an eyeball model used in a simulation.

Next, a simulation performed with respect to focus-free properties is described. FIG. 4 is a view of the eyeball model used in the simulation. As illustrated in FIG. 4, an eyeball model 80 used in the simulation includes the cornea 68, an anterior chamber 70, the crystalline lens 66, a vitreous body 72, and the retina 62, and has an eyeball length of 24 mm. The laser light 50 as parallel light enters the cornea 68, and reaches the retina 62 after passing through the cornea 68, the anterior chamber 70, the crystalline lens 66, and the vitreous body 72. The respective refractive indexes of the cornea 68, the anterior chamber 70, the crystalline lens 66, and the vitreous body 72 are set at appropriate values.

In the simulation, the shape (curvature) of the crystalline lens 66 was varied, so that the focal length was varied, and original visual acuities were set. As for acquired visual acuities, the actual measurement value obtained in the case where the diameter of the laser light 50 entering the cornea 68 was 470 µm as shown in FIG. 3 was used as the reference in calculating the acquired visual acuities. That is, the diameter of the laser light 50 on the retina 62 when the laser light 50 having a diameter of 470 µm at the time of entering the cornea 68 was calculated, and the ratio between the diameter and the resolution power necessary for obtaining the acquired visual acuity at the time when the diameter of the laser light 50 was 470 µm in FIG. 3 was calculated. With the use of this ratio, the acquired visual acuity in a case where the diameter of the laser light 50 on the retina 62 was varied with a change in the diameter of the laser light 50 entering the cornea 68 was calculated.

Figure 5:
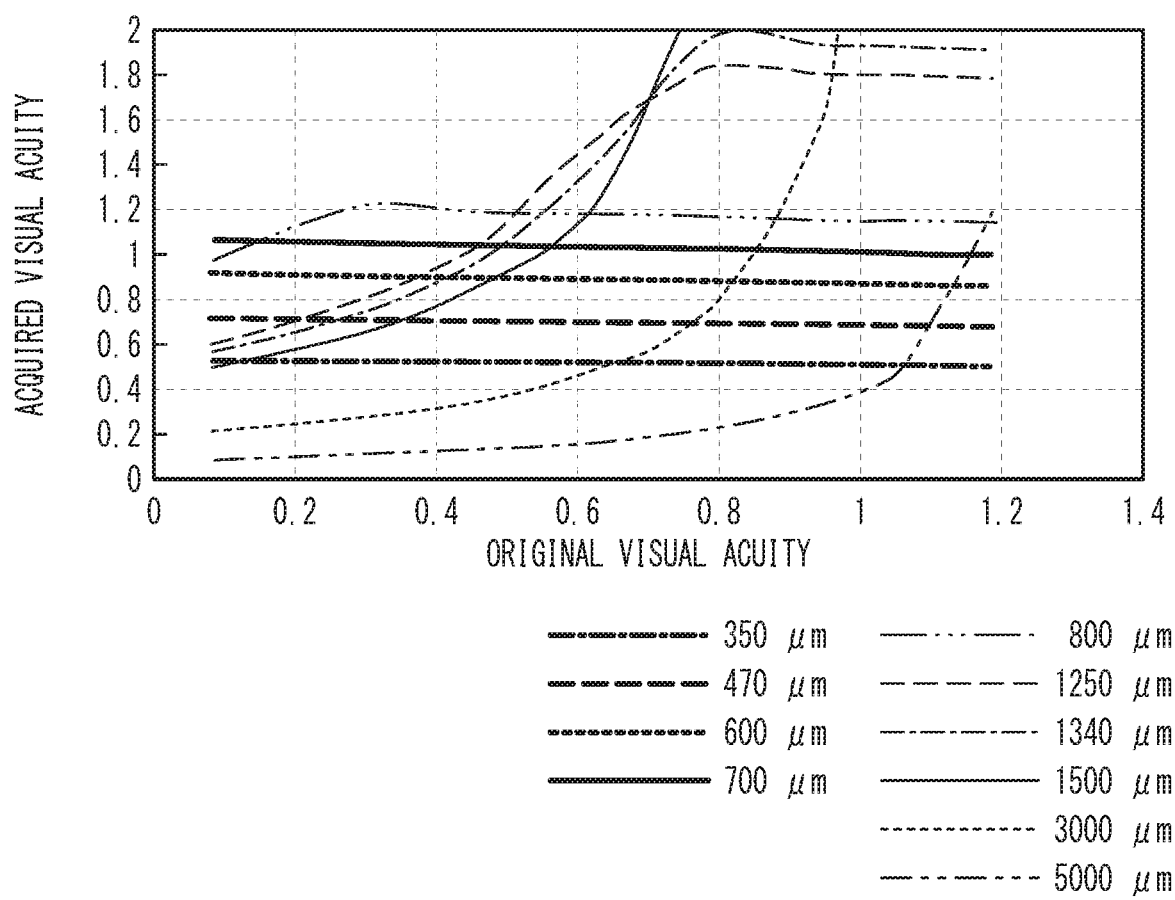
FIG. 5 is a chart showing the results of a simulation related to focus-free properties.

FIG. 5 is a chart showing the results of the simulation related to focus-free properties. In FIG. 5, the abscissa axis indicates original visual acuity, and the ordinate axis indicates acquired visual acuity. In FIG. 5, a bold dot-and-dash line represents the result in a case where the diameter of the laser light 50 entering the cornea 68 was 350 µm, a bold dashed line represents the result in a case where the diameter was 470 µm, a bold dotted line represents the result in a case where the diameter was 600 µm, and a bold solid line represents the result in a case where the diameter was 700 µm. A fine triple-dot and dash line represents the result in a case where the diameter was 800 µm, a fine dashed line represents the result in a case where the diameter was 1250 µm, a fine dot-and-dash line represents the result in a case where the diameter was 1340 µm, a fine solid line represents the result in a case where the diameter was 1500 µm, a fine dotted line represents the result in a case where the diameter was 3000 µm, and a fine double-dot and dash line represents the result in a case where the diameter was 5000 µm.

As shown in FIG. 5, in a case where the diameter of the laser light 50 entering the cornea 68 was not smaller than 350 µm and not larger than 700 µm, a substantially constant visual acuity was acquired with different original visual acuities, and focus-free properties were acquired. Further, a visual acuity of about 0.5 or higher was acquired. When the diameter of the laser light 50 entering the cornea 68 became 800 µm, almost focus-free properties were obtained. However, the acquired visual acuity decreased when the original visual acuity was about 0.3 and lower, and focus-free properties started being degraded. When the diameter was 1250 µm or larger, the acquired visual acuity decreased as the original visual acuity became lower, and focus-free properties were not acquired.

Therefore, in the first embodiment, the diameter adjustment unit 24 is disposed in the light path for the laser light 50 between the collimator lens 22 and the scan mirror 28, so that the diameter of the laser light 50 entering the cornea 68 is adjusted to a value not smaller than 310 µm and not greater than 800 µm by the diameter adjustment unit 24. As can be seen from the actual measurement value results described with reference to FIG. 3, and the simulation results described with reference to FIG. 5, the diameter of the laser light 50 entering the cornea 68 is adjusted to a value that is not smaller than 310 µm and not larger than 800 µm, so that a visual acuity of 0.4 or higher can be acquired, and focus-free properties can also be acquired. Thus, it is possible to provide users having different original visual acuities with high-quality images.

The image data to be input to the image input unit 32 may be image data along the line of sight of the user that is captured by the camera 40. In this case, as a line-of-sight image is projected onto the retina 62, the user can see the line-of-sight image with an acquired visual acuity of 0.4 or higher. It should be noted that the image data along the line of sight of the user that is to be input to the image input unit 32 is not necessarily image data captured by the camera 40, and may be image data captured by a camera of an external device (such as a mobile terminal), for example.

Further, as can be seen from the results shown in FIGS. 3 and 5, a user having an original visual acuity in the range of 0.04 to 1.2 can see an image projected onto the retina 62 with an acquired visual acuity of 0.4 or higher. For example, in a case where the image data input to the image input unit 32 is image data along the line of sight of the user that has been captured by the camera 40, and an image along the line of sight of the user is projected onto the retina 62, a user having an original visual acuity in the range of 0.04 to 1.2 can see the image along the line of sight of the user with an acquired visual acuity of 0.4 or higher. Furthermore, the acquired visual acuity of a user having an original visual acuity in the range of 0.04 to 1.2 is substantially constant with the diameter of the laser light 50. Accordingly, it is possible to provide a user having an original visual acuity in the range of 0.04 to 1.2 with an image projected onto the retina 62 with a substantially constant acquired visual acuity of 0.4 or higher, irrespective of the original visual acuity.

As can be seen from FIG. 5, the acquired visual acuity of a user having an original visual acuity in the range of 0.04 to 1.2 varies from 0.4 to 1.2, depending on the diameter of the laser light 50. Because of this, the image projection device 100 of the first embodiment is preferably used for a user having an original visual acuity in the range of 0.04 to 1.0, is more preferably used for a user having an original visual acuity in the range of 0.04 to 0.6, and is even more preferably used for a user having an original visual acuity in the range of 0.04 to 0.4. In this manner, a higher visual acuity than the original visual acuity can be acquired.

It is preferable to acquire a high visual acuity, while also acquiring focus-free properties. As shown in FIG. 5, as the diameter of the laser light 50 entering the cornea 68 becomes larger, the acquired visual acuity becomes higher. Therefore, the diameter of the laser light 50 entering the cornea 68 is preferably not smaller than 400 µm and not larger than 800 µm, more preferably not smaller than 500 µm and not larger than 800 µm, and even more preferably not smaller than 600 µm and not larger than 800 µm. Further, to acquire focus-free properties for a user having an original visual acuity of 0.3 or lower, the diameter of the laser light 50 entering the cornea 68 is preferably not larger than 700 µm.

According to the first embodiment, the diameter adjustment unit 24 that adjusts the diameter of the laser light 50 entering the cornea 68 is provided, as shown in FIGS. 1 and 2. With this, it is possible to easily adjust the diameter of the laser light 50 entering the cornea 68 to an appropriate size that is not smaller than 310 µm and not larger than 800 µm. The diameter adjustment unit 24 is preferably disposed in the light path for the laser light 50 between the collimator lens 22 and the scan mirror 28. With this arrangement, the laser light 50 as substantially parallel light enters the diameter adjustment unit 24, and thus, it becomes easier to adjust the diameter of the laser light 50 entering the cornea 68.

In the example case described in the first embodiment, the diameter of the laser light 50 entering the cornea 68 is adjusted by controlling the opening 36 of the diameter adjustment unit 24. However, the present invention is not limited to this case. For example, the diameter adjustment unit 24 may be disposed at a portion where the laser light 50 is not substantially parallel light, and the diameter adjustment unit 24 may be moved forward and backward relative to the laser light 50, to adjust the diameter of the laser light 50 entering the cornea 68.

Second Embodiment

As can be seen from the results shown in FIG. 5 of the first embodiment, it is possible to acquire a higher visual acuity by increasing the diameter of the laser light 50 entering the cornea 68. For example, it has become apparent that it is possible to acquire a visual acuity of about 1.0 or higher by adjusting the diameter of the laser light 50 entering the cornea 68 to 800 µm or larger. However, as the diameter of the laser light 50 becomes larger, the focal depth of the laser light 50 becomes smaller. Therefore, depending on the original visual acuity, a higher visual acuity might not be acquired, and the user might not be provided with any high-quality image. In view of this, in a case where the diameter of the laser light 50 is made larger, the numerical aperture (NA) of the laser light 50 entering the cornea 68 is preferably adjusted to an appropriate value.

Figure 6:
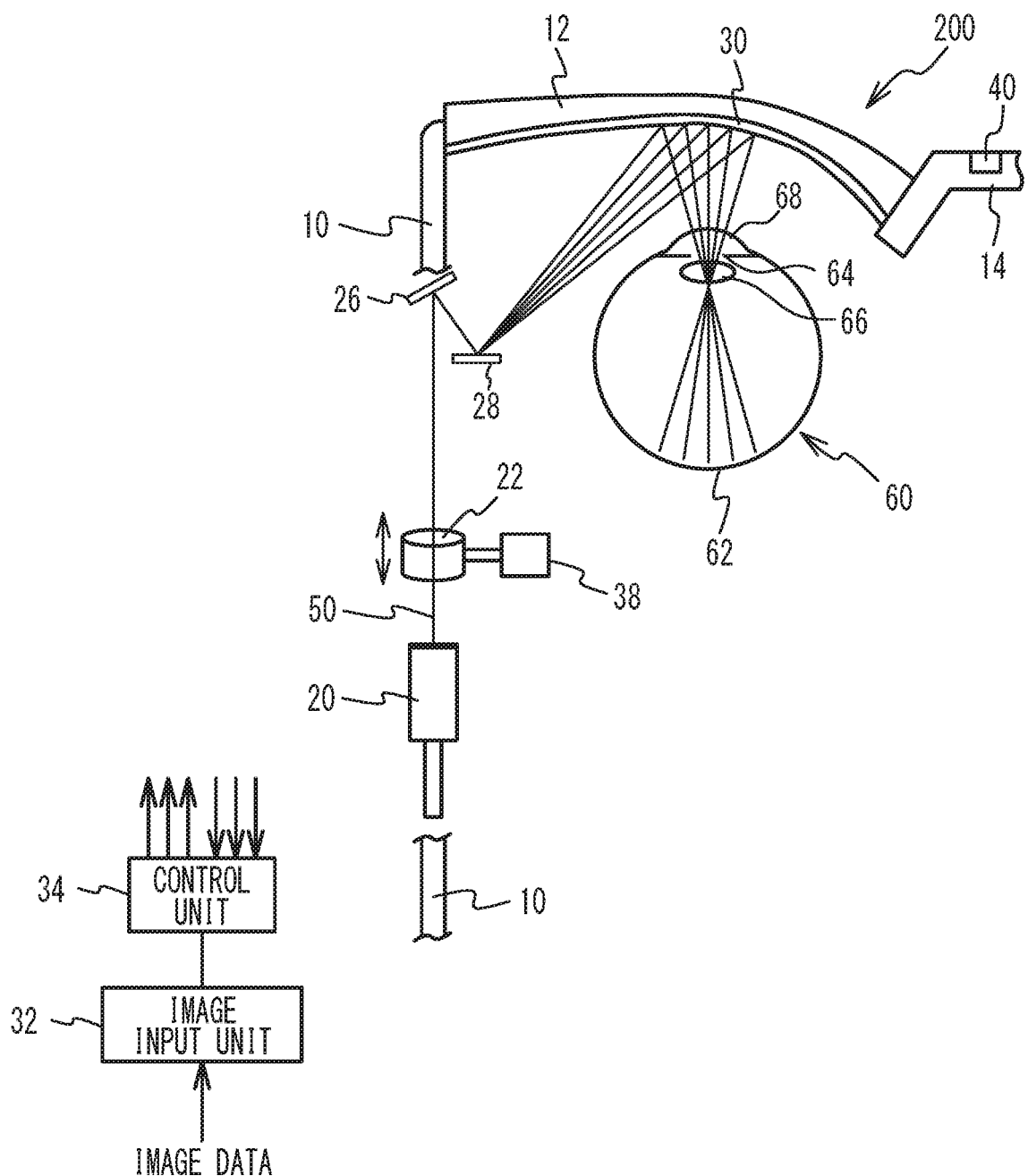
FIG. 6 is a top view of an image projection device according to a second embodiment.

FIG. 6 is a top view of an image projection device according to a second embodiment. As illustrated in FIG. 6, an image projection device 200 of the second embodiment does not include the diameter adjustment unit 24, but includes an adjustment unit 38 on the temple 10 of the eyeglass. The adjustment unit 38 adjusts the numerical aperture of the laser light 50 entering the cornea 68, by moving the position of the collimator lens 22 in a direction parallel to the traveling direction of the laser light 50 passing through the collimator lens 22. The adjustment unit 38 is an actuator, for example. In accordance with an instruction from the user, for example, the control unit 34 controls and causes the adjustment unit 38 to move the position of the collimator lens 22. The other aspects of the structure are the same as those of the first embodiment, and therefore, explanation thereof is not repeated herein.

An experiment conducted on a plurality of users having different visual acuities is now described. This experiment was conducted to examine how the acquired visual acuity of each user would change, by varying the numerical aperture of the laser light 50 entering the cornea 68. The experiment was conducted on a plurality of users having different visual acuities of 0.04, 0.5, 0.9, and 1.2, and was carried out by measuring how good each user was able to visually recognize an image projected onto the retina 62 while the laser light 50 with a diameter of 1490 mm is entered the cornea 68 and the numerical aperture of the laser light 50 entering the cornea 68 was varied. The image projected onto the retina 62 is an image that has a horizontal viewing angle of 20 degrees, a screen aspect ratio of 16:9, and a valid vertical resolution of 720, as in the first embodiment.

Figure 7:
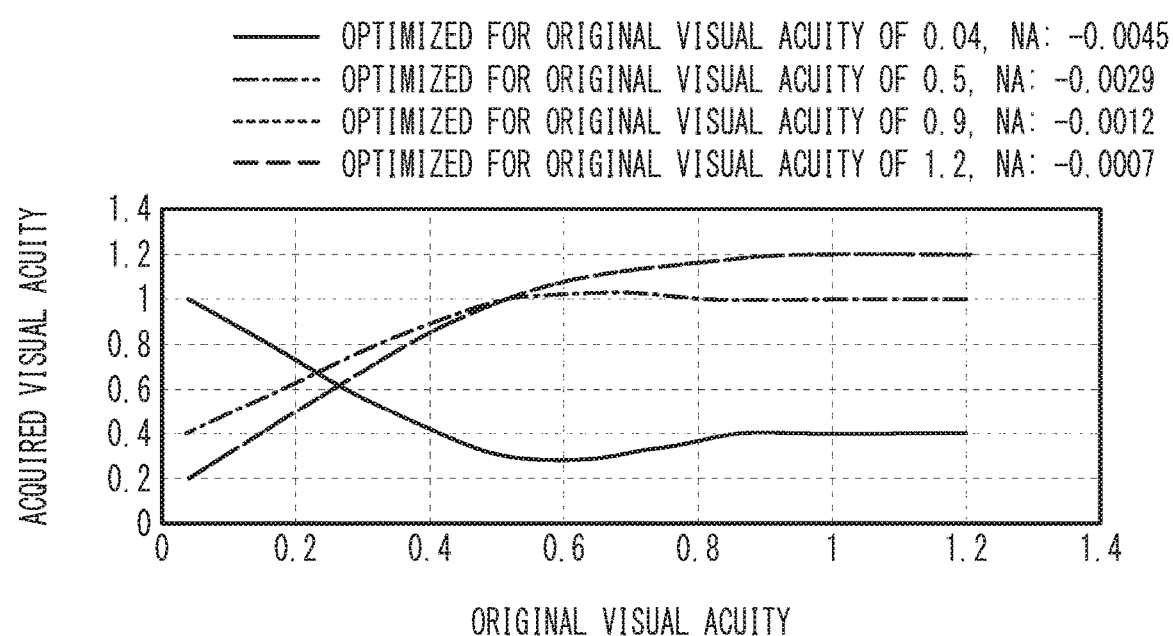
FIG. 7 is a chart showing the results of an experiment conducted to examine the relationship between original visual acuity and acquired visual acuity in a case where the numerical aperture of laser light entering the cornea was varied.

FIG. 7 is a chart showing the results of the experiment conducted to examine the relationship between original visual acuity and acquired visual acuity in a case where the numerical aperture of the laser light entering the cornea was varied. In FIG. 7, the abscissa axis indicates original visual acuity, and the ordinate axis indicates acquired visual acuity. A solid line represents the result in the case where optimization was performed for a user having an original visual acuity of 0.04, a dot-and-dash line represents the result in the case where optimization was performed for a user having an original visual acuity of 0.5, a dotted line represents the result in the case where optimization was performed for a user having an original visual acuity of 0.9, and a dashed line represents the result in the case where optimization was performed for a user having an original visual acuity of 1.2. It should be noted that, in actual measurement evaluation, it is not possible to measure an acquired visual acuity of 1.2 or higher, due to the relation with the screen resolution. Further, in FIG. 7, the numerical aperture of the laser light 50 entering the cornea 68 has a negative value in cases where the laser light 50 as diverging light enters the cornea 68.

As shown in FIG. 7, in the case where the numerical aperture of the laser light 50 entering the cornea 68 was optimized for the user having the original visual acuity of 0.04, the optimum value of the numerical aperture was −0.0045, and the acquired visual acuity of the user having the original visual acuity of 0.04 was about 1.0. As the original visual acuity became higher than 0.04, the acquired visual acuity became lower than 1.0. In the case where the numerical aperture of the laser light 50 entering the cornea 68 was optimized for the user having the original visual acuity of 0.5, the optimum value of the numerical aperture was −0.0029, and the acquired visual acuity of the user having the original visual acuity of 0.5 was about 1.0. The acquired visual acuity was about 1.0 even when the original visual acuity because higher than 0.5. However, as the original visual acuity became lower than 0.5, the acquired visual acuity became lower than 1.0.

In the case where the numerical aperture of the laser light 50 entering the cornea 68 was optimized for the user having the original visual acuity of 0.9, the optimum value of the numerical aperture was −0.0012, and the acquired visual acuity of the user having the original visual acuity of 0.9 was about 1.2. In the case where the numerical aperture of the laser light 50 entering the cornea 68 was optimized for the user having the original visual acuity of 1.2, the optimum value of the numerical aperture was −0.0007, and the acquired visual acuity of the user having the original visual acuity of 1.2 was about 1.2. In the cases where the original visual acuity was 0.9 and 1.2, the graphs of the acquired visual acuity with respect to the original visual acuity became substantially identical. As the original visual acuity became lower than 0.9, the acquired visual acuity became lower than 1.2.

As can be seen from the experiment results shown in FIG. 7, the optimum value of the numerical aperture of the laser light 50 entering the cornea 68 varies with original visual acuities.

Next, a simulation performed to examine the relationship between original visual acuity and acquired visual acuity in a case where the laser light entering the cornea was varied is described. The simulation was performed with the use of the eyeball model 80 described with reference to FIG. 4 of the first embodiment, and original visual acuities were set, and acquired visual acuities were calculated by the techniques described in the first embodiment.

Figure 8A:
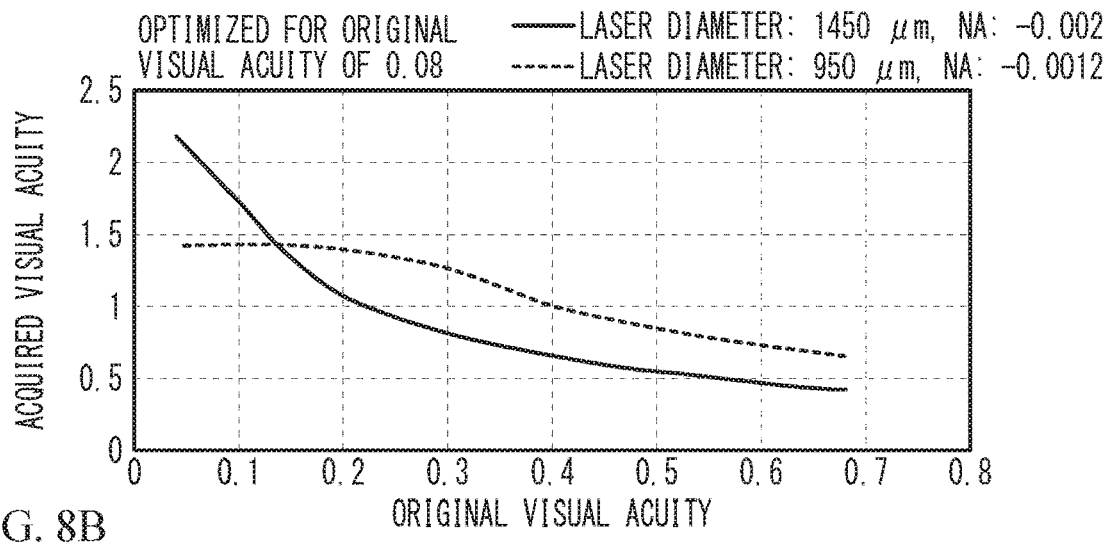
FIGS. 8A through 8C are charts showing the results of a simulation performed to examine the relationship between original visual acuity and acquired visual acuity in a case where the numerical aperture of laser light entering the cornea was varied.
Figure 8B:
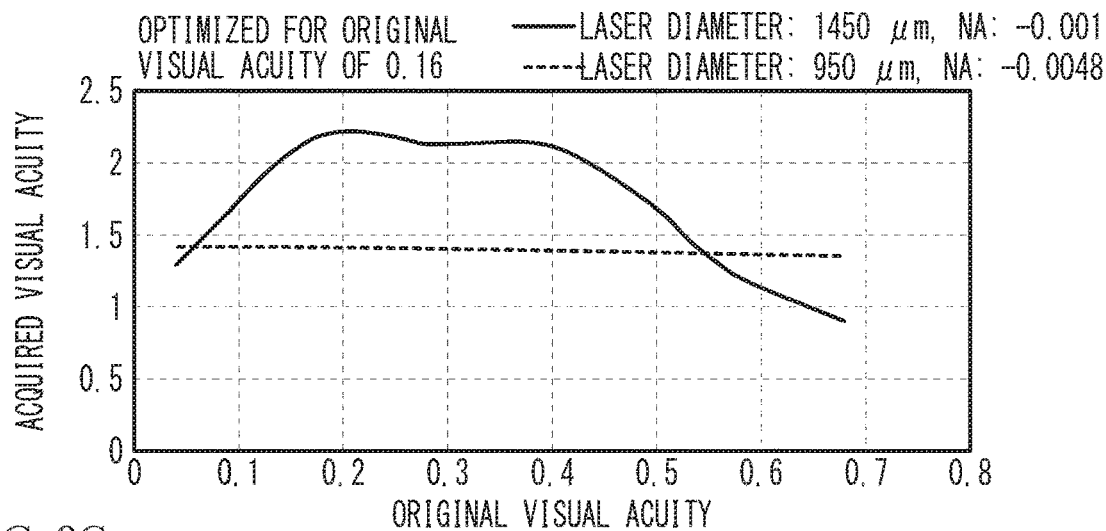
Figure 8C:
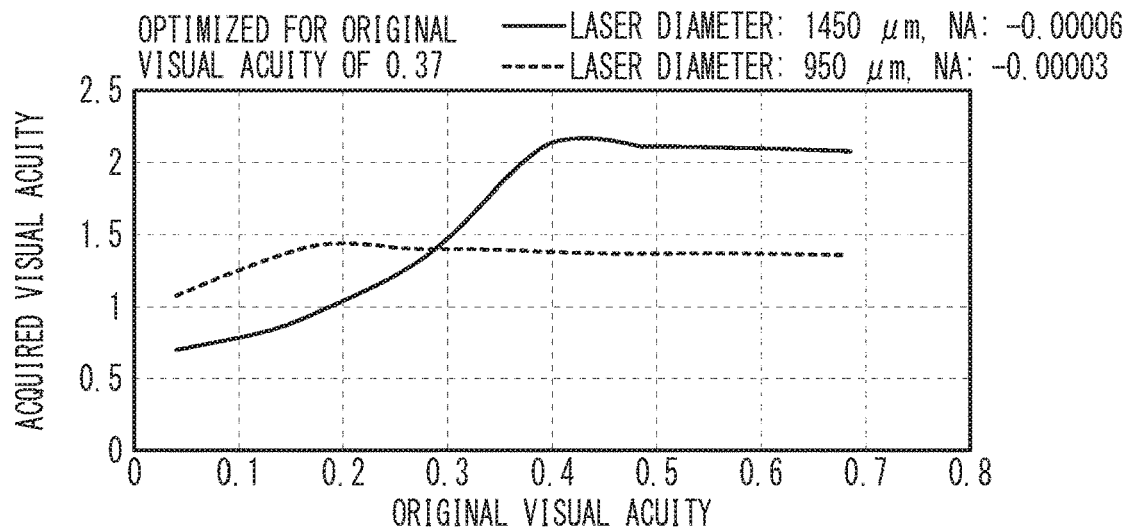

FIGS. 8A through 8C are charts showing the results of a simulation performed to examine the relationship between original visual acuity and acquired visual acuity in cases where the numerical aperture of the laser light entering the cornea was varied. FIG. 8A shows the simulation results in a case where the numerical aperture was optimized for an original visual acuity of 0.08. FIG. 8B shows the simulation results in a case where the numerical aperture was optimized for an original visual acuity of 0.16. FIG. 8C shows the simulation results in a case where the numerical aperture was optimized for an original visual acuity of 0.37. In each of FIGS. 8A through 8C, the abscissa axis indicates original visual acuity, and the ordinate axis indicates acquired visual acuity. A solid line represents the result in a case where the diameter of the laser light 50 entering the cornea 68 was 1450 μm, and a dotted line represents the results in a case where the diameter was 950 μm. It should be noted that, in FIGS. 8A through 8C, the numerical aperture of the laser light 50 entering the cornea 68 is also a negative value in a case where the laser light 50 as diverging light enters the cornea 68.

As shown in FIG. 8A, in a case where the value of the numerical aperture was optimized for the original visual acuity of 0.08, when the diameter of the laser light 50 was 1450 μm, the optimum value of the numerical aperture was −0.002, and the acquired visual acuity was about 1.8. When the diameter of the laser light 50 was 950 m, the optimum value of the numerical aperture was −0.0012, and the acquired visual acuity was about 1.45. When the diameter of the laser light 50 was 1450 μm, the acquired visual acuity became higher than 1.8 in a case where the original visual acuity was lower than 0.08. However, when the original visual acuity became higher than 0.08, the acquired visual acuity became lower than 1.8. When the diameter of the laser light 50 was 950 μm, a visual acuity of about 1.45 was acquired with an original visual acuity of 0.05 to 0.2. However, when the original visual acuity became higher than 0.2, the acquired visual acuity became lower than 1.45.

As shown in FIG. 8B, in a case where the value of the numerical aperture was optimized for the original visual acuity of 0.16, when the diameter of the laser light 50 was 1450 μm, the optimum value of the numerical aperture was −0.001, and the acquired visual acuity was about 2.2. When the diameter of the laser light 50 was 950 μm, the optimum value of the numerical aperture was −0.0048, and the acquired visual acuity was about 1.45. When the diameter of the laser light 50 was 1450 μm, a visual acuity of 2.0 or higher was acquired with an original visual acuity of 0.14 to 0.43. However, when the original visual acuity became lower than 0.14 or higher than 0.43, the acquired visual acuity became lower than 2.0. When the diameter of the laser light 50 was 950 μm, a visual acuity of about 1.45 was acquired with an original visual acuity of 0.05 to 0.68.

As shown in FIG. 8C, in a case where the value of the numerical aperture was optimized for the original visual acuity of 0.37, when the diameter of the laser light 50 was 1450 μm, the optimum value of the numerical aperture was −0.00006, and the acquired visual acuity was about 2.2. When the diameter of the laser light 50 was 950 μm, the optimum value of the numerical aperture was −0.00003, and the acquired visual acuity was about 1.45. When the diameter of the laser light 50 was 1450 μm, a visual acuity of 2.0 or higher was acquired with an original visual acuity of 0.36 to 0.68. However, when the original visual acuity became lower than 0.36, the acquired visual acuity became lower than 2.0. When the diameter of the laser light 50 was 950 μm, a visual acuity of about 1.45 was acquired with an original visual acuity of 0.17 to 0.68. However, when the original visual acuity became lower than 0.17, the acquired visual acuity became lower than 1.45.

Accordingly, as can also be seen from the simulation results shown in FIGS. 8A through 8C, the optimum value of the numerical aperture of the laser light 50 entering the cornea 68 varies with original visual acuities.

Therefore, the second embodiment includes the adjustment unit 38 that adjusts the numerical aperture of the laser light 50 entering the cornea 68. With this, the user can acquire a high visual acuity (or a feeling of high resolution) for an image projected onto the retina 62. Thus, the user can be provided with a high-quality image. As can be seen from the results shown in FIGS. 7 through 8C, the laser light 50 entering the cornea 68 is preferably diverging light.

The image data to be input to the image input unit 32 may be image data along the line of sight of the user that is captured by the camera 40. In this case, as a line-of-sight image is projected onto the retina 62, the user can see the line-of-sight image with a high acquired visual acuity. It should be noted that the image data along the line of sight of the user that is to be input to the image input unit 32 is not necessarily image data captured by the camera 40, and may be image data captured by a camera of an external device (such as a mobile terminal), for example.

Meanwhile, the diameter of the laser light 50 entering the cornea 68 is preferably not smaller than 800 μm and not larger than 3000 μm. This is because, as can be seen from the results shown in FIG. 5, it is possible to acquire a high visual acuity in a case where the diameter of the laser light 50 entering the cornea 68 is not smaller than 800 μm and not larger than 3000 μm. To acquire a high visual acuity, the diameter of the laser light 50 entering the cornea 68 is preferably not smaller than 800 μm and not larger than 3000 μm, more preferably not smaller than 1250 μm and not larger than 3000 μm, and even more preferably not smaller than 1500 μm and not larger than 3000 μm.

Further, as can be seen from the results shown in FIGS. 7 through 8C, a user having an original visual acuity that is not lower than 0.04 but is lower than 1.2 can see an image projected onto the retina 62 with a higher acquired visual acuity than the original visual acuity, because the adjustment unit 38 adjusts the numerical aperture of the laser light 50 entering the cornea 68. For example, in a case where the image data to be input to the image input unit 32 is image data along the line of sight of the user that has been captured by the camera 40, and an image along the line of sight of the user is projected onto the retina 62, a user having an original visual acuity that is not lower than 0.04 but is lower than 1.2 can see the image along the line of sight of the user with a higher acquired visual acuity than the original visual acuity.

As can be seen from the results shown in FIG. 7, the visual acuity to be acquired by adjusting the numerical aperture of the laser light 50 entering the cornea 68 to an optimum value is not lower than 1.0 but is lower than 1.2. Because of this, the image projection device 200 of the second embodiment is preferably used for a user having an original visual acuity in the range of 0.04 to 1.0, is more preferably used for a user having an original visual acuity in the range of 0.04 to 0.5, and is even more preferably used for a user having an original visual acuity in the range of 0.04 to 0.2.

Further, according to the second embodiment, the adjustment unit 38 adjusts the numerical aperture of the laser light 50 entering the cornea 68, by moving the position of the collimator lens 22 in a direction parallel to the traveling direction of the laser light 50 passing through the collimator lens 22 and thus changing the distance between the light source 20 and the collimator lens 22. In this manner, the numerical aperture of the laser light 50 can be easily adjusted. The adjustment unit 38 may adjust the numerical aperture of the laser light 50 entering the cornea 68 by some other technique. For example, the adjustment unit 38 may adjust the numerical aperture of the laser light 50 by moving the position of the light source 20 in a direction parallel to the traveling direction of the laser light 50 and thus changing the distance between the light source 20 and the collimator lens 22, or may adjust the numerical aperture of the laser light 50 by moving both the collimator lens 22 and the light source 20.

Figure 9:
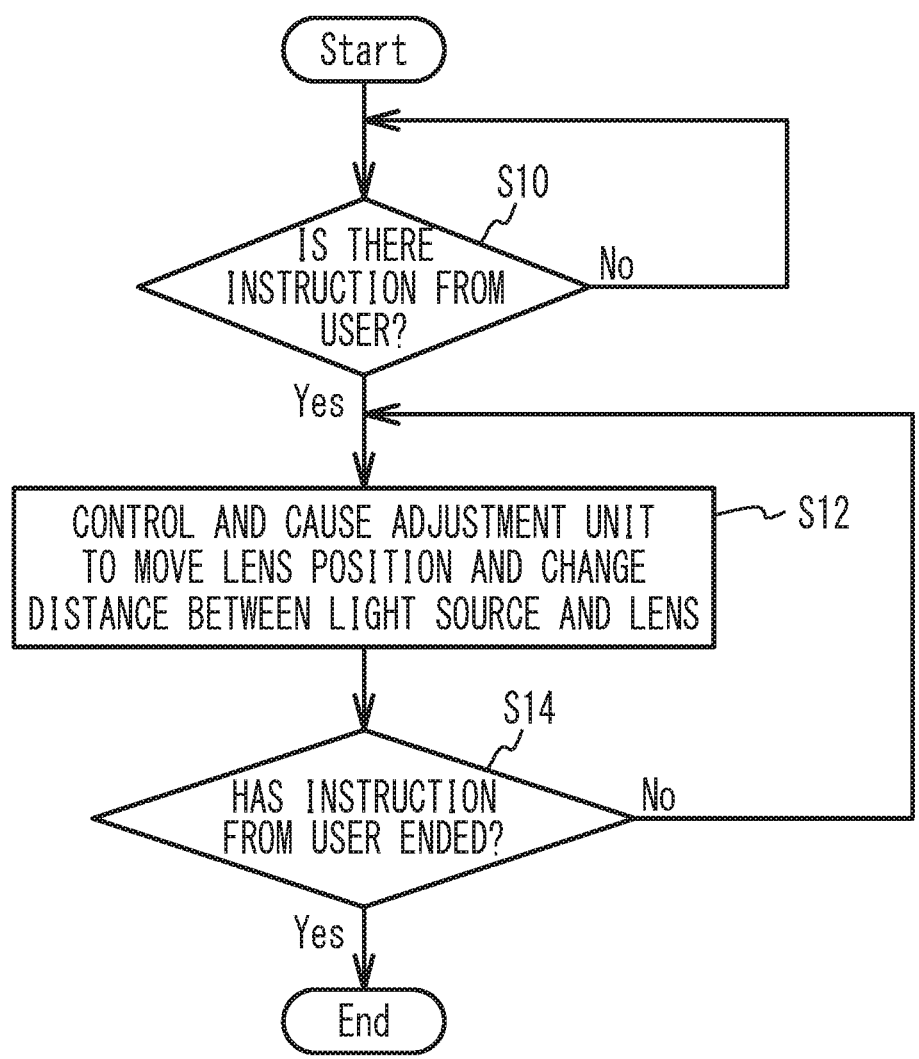
FIG. 9 is an example of a flowchart of the collimate lens position control to be performed by a control unit.

The user may directly touch the adjustment unit 38 to move the position of the collimator lens 22. However, fine position adjustment is to be performed, and therefore, it is preferable that the control unit 34 controls and causes the adjustment unit 38 to move the position of the collimator lens 22, in accordance with an instruction from the user. FIG. 9 is an example of a flowchart of the collimator lens position control to be performed by the control unit 34. As shown in FIG. 9, the control unit 34 stands by until there an instruction as to movement of the position of the collimator lens 22 is issued from the user (step S10: No). The user operates an external device (a mobile terminal, for example) that includes the control unit 34, for example, to instruct the control unit 34 as to movement of the position of the collimator lens 22. When the control unit 34 receives the instruction from the user (step S10: Yes), the control unit 34 controls and causes the adjustment unit 38 to move the position of the collimator lens 22 in accordance with the instruction from the user, to change the distance between the light source 20 and the collimator lens 22 (step S12). The control unit 34 then determines whether the instruction from the user has ended (step S14). If the instruction from the user has not ended (step S14: No), the control unit 34 again carries out step S12. If the instruction from the user has ended (step S14: Yes), the control unit 34 ends the process.

In the first and second embodiments, the projection mirror 30 may have an adjustable surface, or may be a diffractive element. Alternatively, the projection mirror 30 may be a half mirror capable of transmitting light along the line of sight of the eyeball 60, or may be a total reflection mirror through which light does not pass. If the projection mirror 30 is a half mirror, an actual image along the line of sight can pass through the projection mirror 30, and be visually recognized together with the image formed with the laser light 50. If the projection mirror 30 is a total reflection mirror, only the image formed with the laser light 50 can be visually recognized. A component that has the functions of the projection mirror 30 is not necessarily a mirror but may be a lens that has an optical function of gathering the laser light 50 toward the cornea 68 and projecting the laser light 50 onto the retina 62. In a case where such a lens is used, a mirror that does not gather light is disposed in the position of the projection mirror 30, and a lens is disposed on the mirror on the side of the eyeball 60. Alternatively, the layout of the optical components such as the light source 20 and the scan mirror 28 may be adjusted so that the laser light 50 can be projected onto the retina 62 only by a lens. Likewise, the collimator lens 22 is not necessarily a lens, and may be a mirror or a diffractive element having the optical characteristics of a collimator that collimates the laser light 50 to form substantially parallel light. In this case, an appropriate layout can also be set in accordance with the light path for the laser light 50.

In the examples described in the first and second embodiments, each image projection device is an eyeglass-type HMD. However, an image projection device may not be an HMD. In the above described examples, an image is projected onto the retina 62 of an eyeball 60. However, an image may be projected onto the retinas 62 of both eyeballs 60. Further, in the above described examples, the scan mirror 28 serves as a scan unit (scanner). However, the scan unit (scanner) may be any component capable of scanning light beams. For example, some other component, such as potassium tantalate niobate (KTN) crystals that are an electro-optic material, may be used as the scan unit (scanner). Although laser light has been described as an example of light beams, some other kind of light may be used.

Although embodiments of the present invention have been specifically described, the present invention is not limited to those particular embodiments, and various changes and modifications may be made to them without departing from the scope of the invention disclosed in the claims.

The invention claimed is:

1. An image projection device comprising:
a light source that emits a light beam;
an image input unit that inputs image data;
a control unit that controls emission of the light beam from the light source based on the input image data;
a scan unit that scans the light beam emitted from the light source;
a projection optical member that illuminates a retina of an eyeball of a user with the light beam scanned by the scan unit, and projects an image onto the retina; and
an adjustment unit that is disposed in a light path for the light beam between the light source and the scan unit, and adjusts a numerical aperture of the light beam, wherein
when the light beam with a diameter of 1490 μm and the numerical aperture adjusted to −0.0045 by the adjustment unit is entered on a cornea of the eyeball of the user, if an original visual acuity of the user is 0.04, an acquired visual acuity of the user is about 1.0, and if the original visual acuity of the user is higher than 0.04, the acquired visual acuity of the user is lower than 1.0, the acquired visual acuity being a visual acuity for the image based on the image data and projected onto the retina,
when the light beam with the diameter of 1450 μm and the numerical aperture adjusted to −0.002 by the adjustment unit is entered on the cornea of the eyeball of the user, if the original visual acuity of the user is 0.08, the acquired visual acuity of the user is about 1.8, and if the original visual acuity of the user is higher than 0.08, the acquired visual acuity of the user is lower than 1.8,
when the light beam with the diameter of 950 μm and the numerical aperture adjusted to −0.0012 by the adjustment unit is entered on the cornea of the eyeball of the user, if the original visual acuity of the user is 0.08, the acquired visual acuity of the user is about 1.45, and if the original visual acuity of the user is higher than 0.2, the acquired visual acuity of the user is lower than 1.45,
when the light beam with the diameter of 1450 μm and the numerical aperture adjusted to −0.001 by the adjustment unit is entered on the cornea of the eyeball of the user, if the original visual acuity of the user is 0.16, the acquired visual acuity of the user is about 2.2, and if the original visual acuity of the user is higher than 0.43, the acquired visual acuity of the user is lower than 2.0, and
when the light beam with the diameter of 950 μm and the numerical aperture adjusted to −0.0048 by the adjustment unit is entered on the cornea of the eyeball of the user, if the original visual acuity of the user is equal to or higher than 0.05 and is equal to or lower than 0.68, the acquired visual acuity of the user is about 1.45.

2. The image projection device according to claim 1, further comprising
a collimator that is disposed in the light path for the light beam between the light source and the scan unit, and collimates the light beam to form substantially parallel light,
wherein the adjustment unit adjusts the numerical aperture of the light beam, by moving a position of the collimator in a direction parallel to a traveling direction of the light beam at a time when the light beam passes through the collimator.

3. The image projection device according to claim 2, wherein the control unit controls and causes the adjustment unit to change a distance between the light source and the collimator, in accordance with an instruction from the user.

4. The image projection device according to claim 1, wherein the adjustment unit adjusts the numerical aperture of the light beam, by moving a position of the light source in a direction parallel to a traveling direction of the light beam.

5. The image projection device according to claim 1, wherein the light beam at the time of entering the cornea is diverging light.

6. The image projection device according to claim 1, wherein the image data input to the image input unit is image data along a line of sight of the user, the image data along the line of sight of the user having been captured by a camera, and
the acquired visual acuity is a visual acuity for the image projected onto the retina based on the image data along the line of sight of the user having been captured by the camera.

* * * * *